Jan. 12, 1954      G. A. LYON      2,665,947
WHEEL COVER
Filed June 20, 1951      2 Sheets-Sheet 1
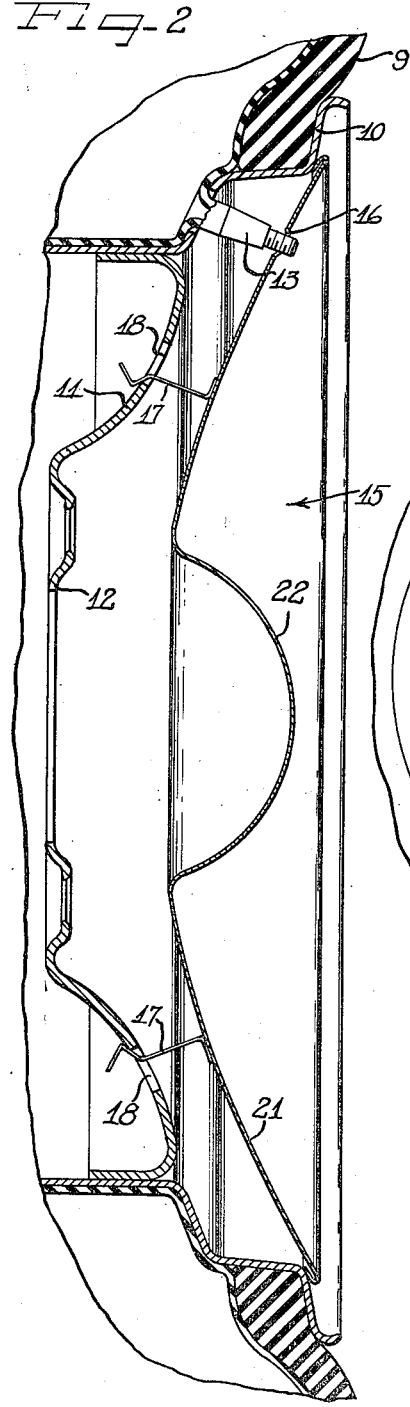
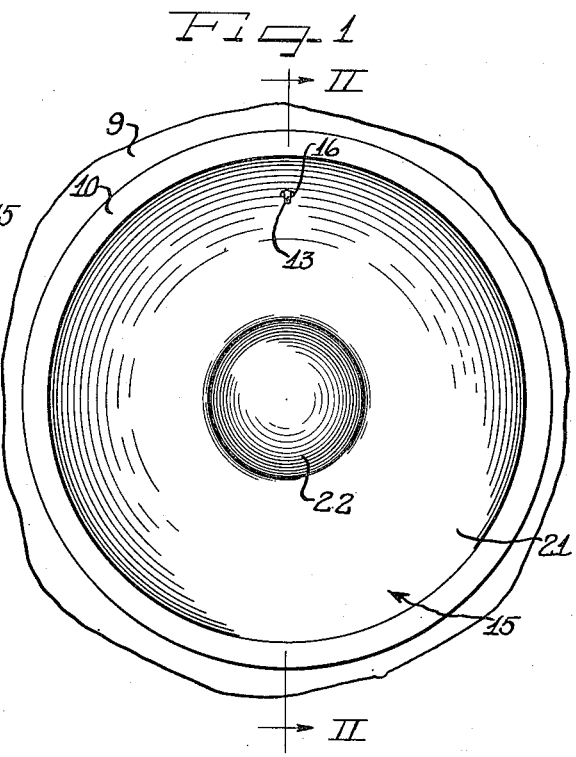
Inventor
George Albert Lyon
By Hill, Sherman, Meroni, Gross & Simpson Attys Jan. 12, 1954 G. A. LYON 2,665,947
WHEEL COVER
Filed June 20, 1951 2 Sheets-Sheet 2
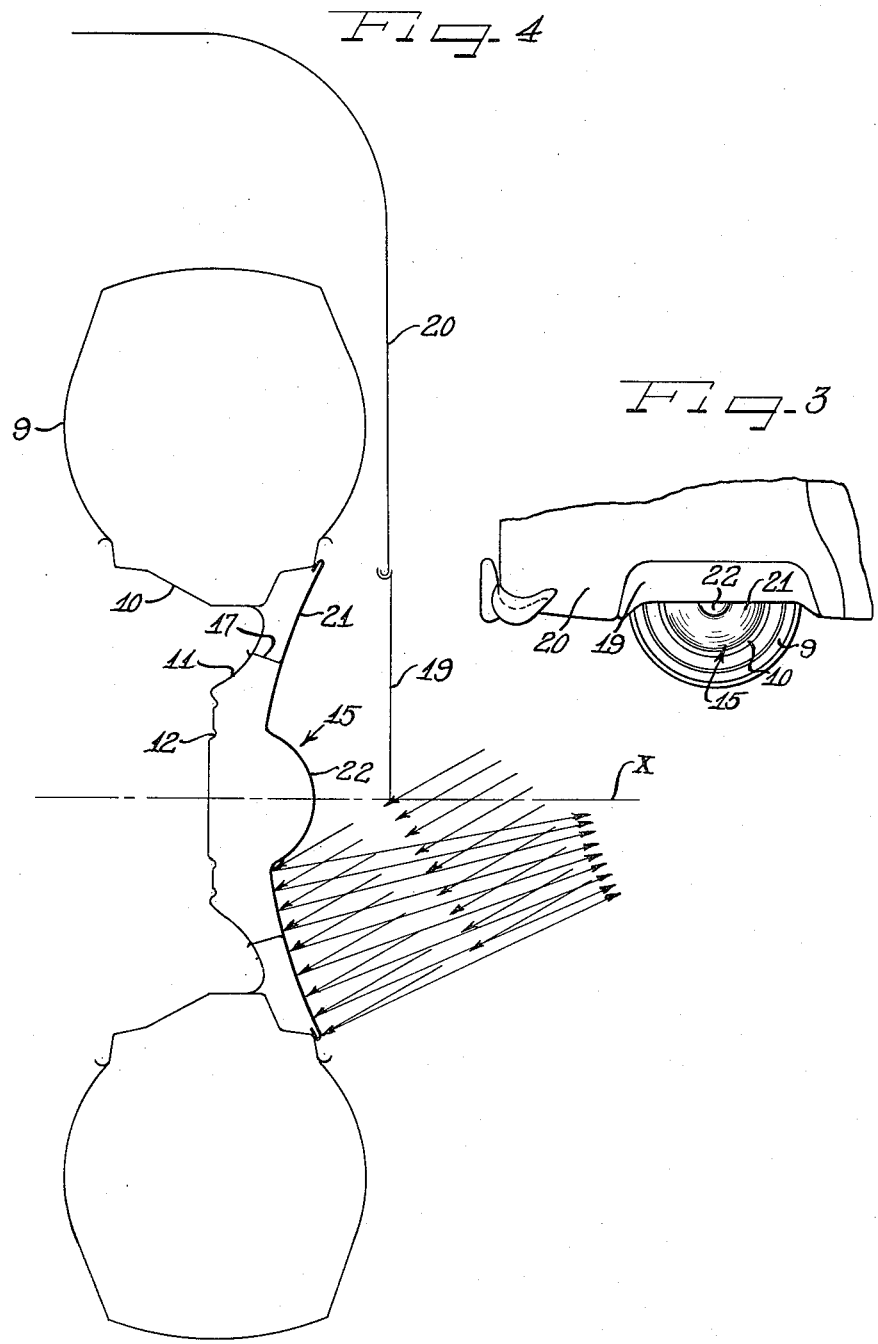
Inventor
George Albert Lyon

Patented Jan. 12, 1954

2,665,947

UNITED STATES PATENT OFFICE 2,665,947

WHEEL COVER

George Albert Lyon, Detroit, Mich.

Application June 20, 1951, Serial No. 232,622

5 Claims. (Cl. 301—37)

This invention relates to automobile wheel covers and more particularly to one which is highly ornamental from the standpoint of its effectiveness in reflecting light.

At the present time in automobiles it is the practice to cover a large portion of the wheel and particularly the rear wheel with a fender skirt leaving only about one-half of the wheel exposed below the fender skirt. This covering up of the wheel results in a partial covering of any wheel cover on the wheel and detracts materially from the appearance of the wheel.

In the usage of wheel covers it has been my observation that wheel covers used in the installation of the foregoing character look dull and drab due to the fact that the covering of about one-half the wheel cover precludes proper high lights on the cover, thereby detracting from the efficacy of the cover as an ornamental accessory.

Where the complete disk is exposed and it has a high lustrous surface, light will be reflected in a circular mass from the same and there is a sufficient area visible as to accentuate the presence of the ornamental disk. However, if substantially or more than one-half of the disk is covered, this effect is lost and the ornamental value of the disk from an accessory standpoint is substantially affected.

It is the aim of my invention to meet the foregoing condition of where the wheel cover or disk is partially concealed by making the disk of such cross-sectional contour that it will reflect such a large amount of light as to still make it distinctly noticeable and valuable as an ornamental device.

Another object of this invention is to so form the cross-sectional contours of the disk that a highly lustrous portion thereof will reflect light generally axially outwardly in inclined planes intersecting the axis line of the wheel a short distance beyond the wheel, whereby anyone standing along side the wheel will have the reflected high lights of the disk clearly brought to his attention.

In accordance with the general features of this invention there is provided in a cover structure for a wheel including multi-flange tire rim and body parts, a circular cover including a radially outer annular portion of such radial extent as to overlie at least a substantial portion of the body part and to extend over the junction of the wheel parts onto a flange of the rim part. This annular portion is inclined from the body part out to the rim flange and is slightly convexly curved so that its highly lustrous surface will reflect light generally axially outward in inclined planes intersecting the axis line of the wheel a short distance beyond the wheel.

Other objects and features of this invention will more fully appear from the following detailed description taken in connection with the accompanying drawings which illustrates a single embodiment thereof and in which:

Figure 1 is a fragmentary side view of a wheel structure having the cover of my invention applied thereto;

Figure 2 is an enlarged fragmentary cross-sectional view taken on substantially the line II—II of Figure 1, looking in the direction indicated by the arrows;

Figure 3 is a fragmentary side view of a rear fender of an automobile showing the wheel with my novel cover thereon and partially covered by a fender skirt; and Figure 4 is an enlarged diagrammatic profile view showing how my novel cover will reflect light from below the edge of a fender skirt upwardly toward the axis of the wheel.

As shown on the drawings:

The reference character 9 designates generally a conventional pneumatic tire and tube assembly mounted in the usual way upon a multi-flange drop center type of tire rim 10. This tire rim is also carried in the usual way on a dished body or spider part 11 suitably attached to the base flange of the rim. The central portion of the body part 11 comprises a bolt-on flange and is designated generally by the reference character 12. This flange, as is well known in the art, is used to detachably fasten the wheel to a part on an axle of an automobile. A valve stem 13 extends from the tire rim.

My invention is concerned with the provision of an ornamental wheel cover for a conventional wheel of the foregoing type. I have designated such a cover generally by the reference character 15. It comprises a dished metallic stamping made from thin sheet material such, for example, as steel and has a highly lustrous external finish. Such a finish may be provided either by polishing and buffing stainless steel or by chromium plating ordinary steel sheet.

It should be noted that the wheel cover or disk 15 has a hole 17 through which the conventional valve stem 13 extends so that the valve stem is accessible from the exterior of the cover without necessitating removal of the cover from the wheel.

The cover 15 may be retained on the wheel in a detachable manner by any suitable means such, for example, as a plurality of resilient retaining clips 17 adapted to extend into retaining snap-on pry-off relation with the wheel body 11 which is provided with aperture 18 for this purpose.

When the cover is applied to a rear wheel of an automobile as shown in Figure 3, it will be substantially or more than half covered by a fender skirt 19 if such a skirt is used. I have designated the rear fender of this automobile which accommodates the fender skirt 19 by the reference character 20.

In order to more clearly illustrate the point made above, I have shown, in Figure 4 in a diagrammatic manner, the way in which a fender skirt will extend down over substantially one-half of the wheel cover, thereby concealing a very substantial part of the cover. I have found that unless provision is made for compensating for this darkening of the cover, by reason of the concealing skirt 19, the cover does, in use, appear dull. In other words, it does not properly reflect light and as a consequence loses a great deal of its value as an ornamental device for the wheel.

In order to meet this situation, I have devised a cover which, even though substantially half concealed by a fender skirt, will radiate so much light as to still make it a very valuable device from the standpoint of its ornamentation of the wheel.

I accomplish the aim of this invention by providing the wheel cover 15 with a relatively deep, slightly curved convex annular outer section 21 which at its outer periphery laps a flange of the rim and at its inner edge extends close to the bolt-on flange 12 as shown in Fig. 2. The inner margin of this deeply dished ring terminates in a central crown or hub portion 22 which overlies the center or hub part of the wheel. Very desirable results are attained by having the crown portion 22 of smaller diameter than the width of the annular section 21. Thus, where the diameter of the crown portion 22 is only about one-third or less than the diameter of the cover, the width of the annular section 21 is desirably about one-third or greater of the diameter of the cover, so that the annular section 21 actually accounts for about, and preferably slightly more than two-thirds of the diameter of the cover.

It will be noted in Figure 4 that the convexity and angle of inclination of the portion 21 is such that its highly lustrous surface will reflect light upwardly in inclined planes intersecting the axis line X of the wheel a short distance beyond the wheel. This reflection of light by the disk is such that a person standing nearby the side of the car will visualize a relatively large, shiny area. In fact, due to the large area of the cover provided by the annular portion 21 the effect will be almost like hanging a mirror on the lower part of the wheel with the mirror adjusted at such an angle as to throw the light upwardly toward a bystander near the side of the vehicle.

In Figure 4 I have illustrated by lines and arrows how the light strikes the lustrous portion 21 and then is reflected back out toward the axis X of the wheel.

Thus, I have by a simple form of wheel cover been able to catch light from underneath the edge of a fender skirt and to reflect the light back out under the skirt toward an area immediately adjoining a side of the vehicle.

This application is a continuation in part of my application Serial No. 54,164, filed Oct. 12, 1948, and now abandoned.

It will be understood that modifications and variations may be effected without departing from the scope of the novel concepts of the present invention.

I claim as my invention:

1. In a cover structure for a wheel including multi-flange tire rim and body parts, a circular cover including a radially outer annular portion of such radial extent as to overlie at least a substantial part of the body part and to extend over the junction of the wheel parts onto a flange of the rim part, said portion being slightly curved and convex toward the wheel body part and having a highly lustrous external finish so as to reflect light generally axially outwardly in inclined planes intersecting the axis line of the wheel a short distance beyond the wheel, said cover also having a central crown-like portion at the center of said annular portion over the hub of the wheel and bulged in a direction away from the wheel, said crown-like portion being of smaller diameter than the width of said annular portion.

2. In an automobile structure, including a wheel having a flanged rim and body parts and a fender housing the wheel and having a skirt concealing substantially the upper half of the outer side of the wheel, a circular cover including a radially outer annular portion having a lustrous external surface of such radial extent as to overlie a substantial part of the body part and to extend over the junction of the wheel parts onto a flange of the rim part, said surface being smoothly inclined and slightly convex so as to face upwardly at the lower half of the wheel and reflect light upwardly and outwardly below the edge of the skirt.

3. In an automobile wheel, a wheel body, a multi-flange tire rim, said wheel body having a central bolt-on flange, and a cover on the outer side of the wheel and of a diameter to substantially conceal the tire rim and concealing all of the wheel body, said cover having retaining means on the outer margin thereof concealed therebehind and retainingly engaging a flange of the tire rim, said cover comprising a small outwardly convex central crown portion of a diameter to overlie the bolt-on flange of the wheel body and a radially outer annular portion of slightly concavely curved section and extending generally radially and axially outwardly from juncture with the crown portion, said crown portion occupying only substantially one-third of the diameter of the cover and the radially outer portion being of highly polished and reflecting outer surface with the concavity of the surface acting to reflect light outwardly toward the axis line of the wheel.

4. A cover for disposition at the outer side of a vehicle wheel having a multi-flange tire rim and a load sustaining body portion including a central bolt-on flange, a cover member having means at the outer margin thereof for attachment to the tire rim and including a radially outer annular portion and a central crown portion, said radially outer portion being in width about one-third the diameter of the cover and the crown portion being of a diameter not over one-third the diameter of the cover, said annular portion being uniformly dished concavely to a uniform juncture with the crown portion, and the crown portion being inset relative to a plane across the edge of the outer margin of the cover.

5. In an automobile structure, including a wheel having a flanged rim and body parts and a fender housing the wheel and having a skirt concealing substantially the upper half of the outer side of the wheel, a circular trim for the outer side of the wheel, said trim comprising an annular portion having a lustrous external surface of such radial extent as to overlie a substantial part of the body part and to extend over the junction of the wheel parts and over a flange of the rim part, said surface being smoothly inclined so as to face generally upwardly at the lower half of the wheel and reflect light upwardly and outwardly below the edge of the skirt.

GEORGE ALBERT LYON.

References Cited in the file of this patent

UNITED STATES PATENTS

| Number | Name | Date |
|---|---|---|
| 2,162,730 | Lyon | June 20, 1939 |
| 2,368,228 | Lyon | Jan. 30, 1945 |